United States Patent
Wang et al.

(10) Patent No.: US 11,341,306 B1
(45) Date of Patent: May 24, 2022

(54) METHOD FOR BUILDING SPICE CIRCUIT MODEL OF AN OPTICAL COUPLER

(71) Applicant: LITE-ON SINGAPORE PTE. LTD., Singapore (SG)

(72) Inventors: You-Fa Wang, Singapore (SG); Jia Zhou, Singapore (SG)

(73) Assignee: LITE-ON SINGAPORE PTE. LTD., Singapore (SG)

(*) Notice: Subject to any disclaimer, the term of this patent is extended or adjusted under 35 U.S.C. 154(b) by 0 days.

(21) Appl. No.: 17/199,450

(22) Filed: Mar. 12, 2021

(51) Int. Cl.
 *G06F 30/367* (2020.01)
 *G06F 30/398* (2020.01)
 *G06F 119/08* (2020.01)

(52) U.S. Cl.
 CPC .......... *G06F 30/367* (2020.01); *G06F 30/398* (2020.01); *G06F 2119/08* (2020.01)

(58) Field of Classification Search
 USPC ........................................................ 716/100
 See application file for complete search history.

(56) References Cited

U.S. PATENT DOCUMENTS

| | | | | |
|---|---|---|---|---|
| 2007/0168151 A1* | 7/2007 | Kernahan | ............... | G01K 7/425 702/132 |
| 2012/0140792 A1* | 6/2012 | Yeh | .......................... | G01K 7/01 374/170 |
| 2019/0044528 A1* | 2/2019 | Lu | ............................ | G01K 7/14 |
| 2020/0333767 A1* | 10/2020 | Engelstein | ............... | H04Q 9/00 |

* cited by examiner

*Primary Examiner* — Mohammed Alam
(74) *Attorney, Agent, or Firm* — Li & Cai Intellectual Property Office

(57) ABSTRACT

A method for building a simulation program with integrated circuit emphasis (SPICE) circuit model of an optical coupler is provided. The method includes: providing a plurality of electrical parameters of the SPICE circuit model of the optical coupler circuit for a plurality of temperature values, and building the SPICE circuit model of the optical coupler at each of the temperature values according to the electrical parameters of the optical coupler for each of the temperature values, so as to form a plurality of temperature-independent SPICE circuit models of the optical coupler; forming a plurality of temperature-voltage conversion switch circuit elements by utilizing control of a voltage source and temperature characteristics of an impedance; and connecting the temperature-voltage conversion switch circuit elements to the temperature-independent SPICE circuit models of the optical coupler, respectively, so as to build a temperature characterized SPICE circuit model of the optical coupler.

6 Claims, 5 Drawing Sheets

METHOD FOR BUILDING SPICE CIRCUIT MODEL OF AN OPTICAL COUPLER

FIELD OF THE DISCLOSURE

The present disclosure relates to a method for building a temperature characterized circuit model of an optical coupler, and more particularly to a method for building a simulation program with integrated circuit emphasis (SPICE) circuit model of an optical coupler to perform a circuit device simulation within a certain range of temperature.

BACKGROUND OF THE DISCLOSURE

An optical coupler usually includes a light source driving chip (transmitter IC) on an input end, a light source chip (LED, VSCEL or Laser), and a light detection chip (receiver IC) on an output end. The input end and the output end are galvanically isolated from each other, and the input end and the output end transmit information through light. In brief, the optical coupler is a package-level multi-chip optical communication system. A package structure of the optical coupler usually includes two independent metal leadframes (i.e., an input end leadframe and an output end leadframe) that are not electrically connected to each other. A chip (i.e., the light source driving chip) on the input end is mounted on the input end leadframe, and another chip (i.e., the light detection chip) on the output end is mounted on the output leadframe. The input end chip, the output end chip, and a part of each of the leadframes are encapsulated by the encapsulating material. Due to the distinctive package structure of the optical coupler, the chips (i.e., the light source driving chip and the light detection chip) on two sides of the package structure of the optical coupler experience different temperature changes in the same external environment. In addition, the light source chip and the light detection chip or the light source driving chip are made of different semiconductor materials, such that they have different temperature characteristics and temperature coefficients. In this way, it is difficult to build a temperature characterized SPICE (simulation program with integrated circuit emphasis) circuit model of an optical coupler. Conventionally, the SPICE circuit model of an optical coupler is unable to react to parameter changes of the optical coupler caused by ambient temperature changes.

Therefore, it has become an important issue in the industry to provide a method for building the SPICE circuit model of the optical coupler.

SUMMARY OF THE DISCLOSURE

In response to the above-referenced technical inadequacies, the present disclosure provides a method for building a simulation program with integrated circuit emphasis (SPICE) circuit model of an optical coupler.

In one aspect, the present disclosure provides a method for building a SPICE circuit model of an optical coupler. The optical coupler includes at least two chips that are respectively mounted on two leadframes, and the two leadframes are not electrically connected to each other. The method for building the SPICE circuit model of the optical coupler includes: providing a plurality of electrical parameters of the optical coupler for a plurality of temperature values, the electrical parameters at least including a voltage parameter, a current parameter, a time parameter, and building the SPICE circuit model of the optical coupler at each of the temperature values according to the electrical parameters of the optical coupler for each of the temperature values, so as to form a plurality of temperature-independent SPICE circuit models of the optical coupler; creating a plurality of temperature-voltage conversion switch circuit elements by utilizing voltage-controlled switches and temperature characteristics of a resistor. The temperature-voltage conversion switch circuit elements are only turned on at a corresponding one of the temperature values and are turned off at other ones of the temperature values; and connecting an input end, an output end, and an power supply end of each of the temperature-independent SPICE circuit models of the optical coupler for each of the temperature values in series to an end of one of the temperature-voltage conversion switch circuit elements for the corresponding one of the temperature values; connecting the other end of each of the temperature-voltage conversion switch circuit elements corresponding to other ones of the temperature values in parallel to one another, so as to form a new input end, a new output end, and a new power supply end of each of the temperature-independent SPICE circuit models of the optical coupler for each of the temperature values; connecting an input grounding end of each of the temperature-independent SPICE circuit models of the optical coupler for each of the temperature values in parallel to one another to form a new input grounding end, and connecting an output grounding end of each of the temperature-independent SPICE circuit models of the optical coupler for each of the temperature values in parallel to one another to form a new output grounding end, so as to build a temperature characterized SPICE circuit model of the optical coupler.

One of the beneficial effects of the method for building a SPICE circuit model of an optical coupler provided by the present disclosure is that, the method is able to build a SPICE circuit model of an optical coupler including temperature effects on the device, and perform cross temperature circuit simulation of an optical coupler.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
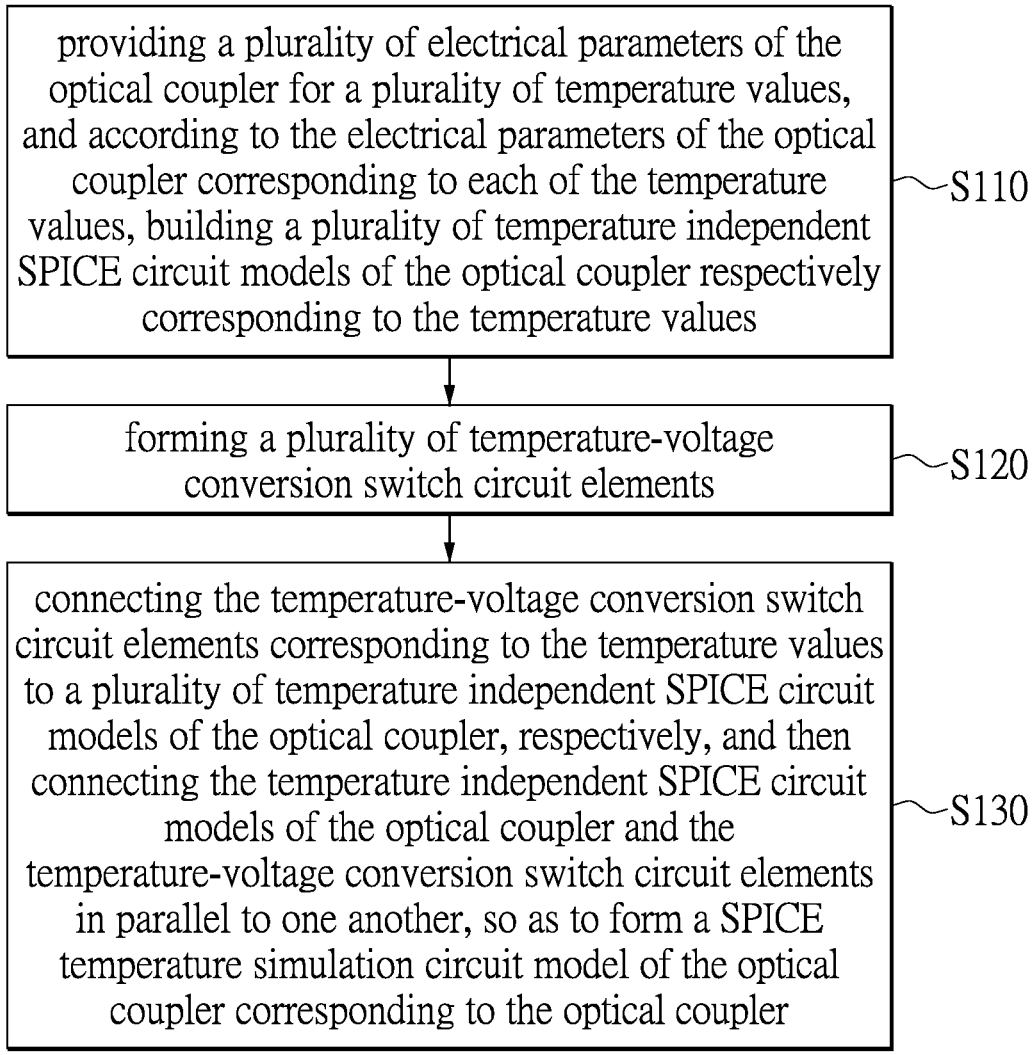
FIG. 1 is a flowchart of a method for building a simulation program with integrated circuit emphasis (SPICE) circuit model of an optical coupler according to an embodiment of the present disclosure.

The present disclosure is more particularly described in the following examples that are intended as illustrative only since numerous modifications and variations therein will be apparent to those skilled in the art. Like numbers in the drawings indicate like elements throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various elements, signals or the like, which are for distinguishing one element/signal from another one only, and are not intended to, nor should be construed to impose any substantive limitations on the elements, signals or the like.

Embodiment

Figure 2:
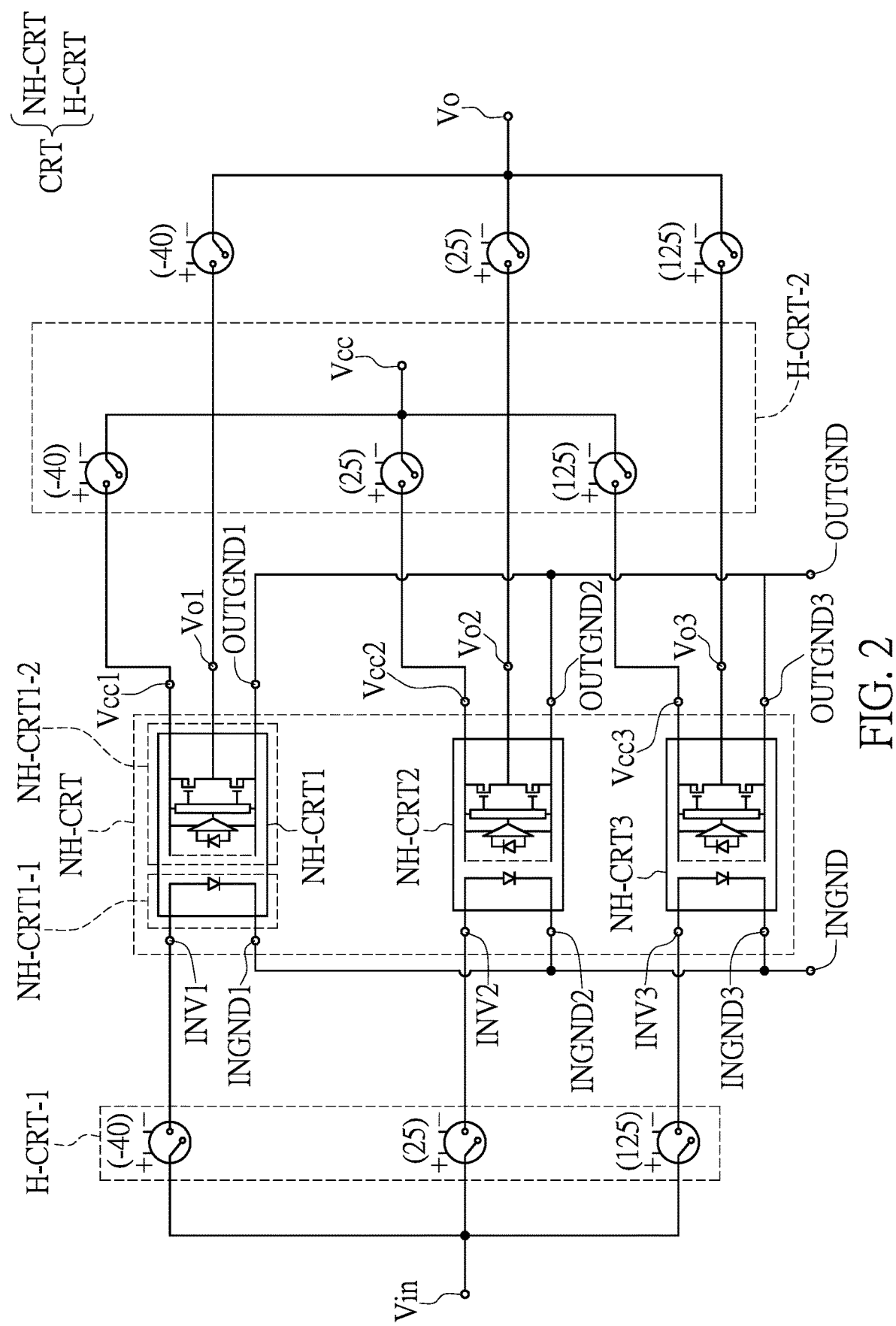
FIG. 2 is a schematic exploded view of the SPICE circuit model of an optical coupler.
Figure 3:
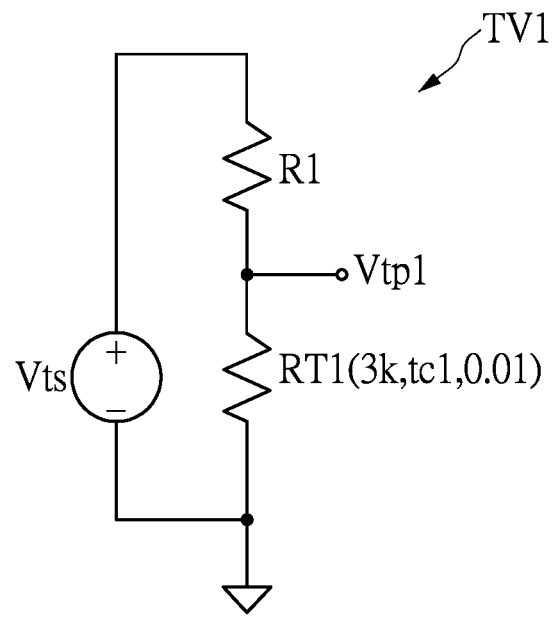
FIG. 3 is a schematic view of a temperature dependent voltage source according to the embodiment of the present disclosure.
Figure 4:
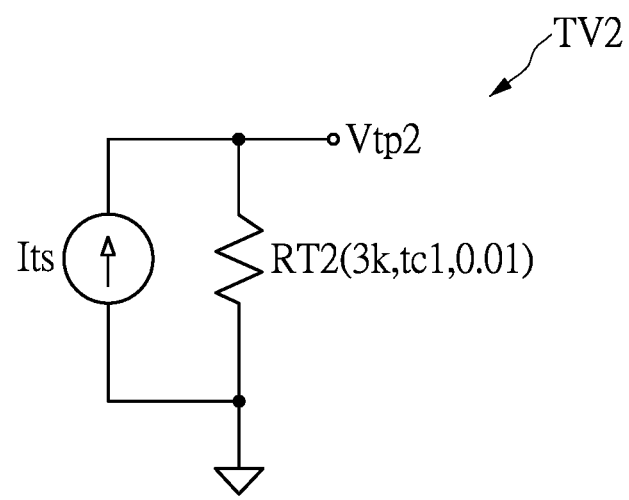
FIG. 4 is a schematic view of another temperature dependent voltage source according to the embodiment of the present disclosure.
Figure 5:
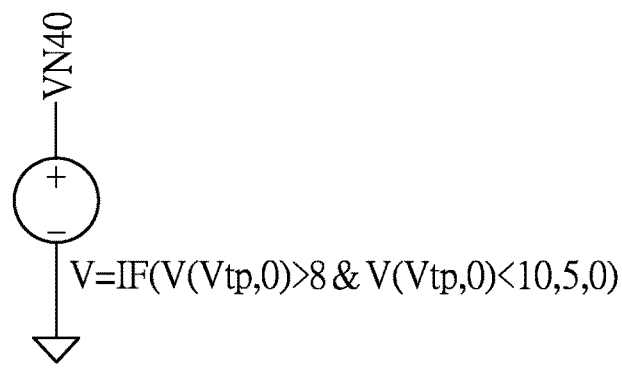
FIG. 5 is a schematic view of a temperature-controlled self-defined voltage source at a temperature value according to the embodiment of the present disclosure.

References are made to FIG. 1 to FIG. 5. FIG. 1 is a flowchart of a method for building a simulation program with integrated circuit emphasis (SPICE) circuit model of an optical coupler according to an embodiment of the present disclosure. FIG. 2 is a schematic exploded view of the SPICE circuit model of an optical coupler. FIG. 3 is a schematic view of a temperature dependent voltage source according to the embodiment of the present disclosure. FIG. 4 is a schematic view of another temperature dependent voltage source according to the embodiment of the present disclosure. FIG. 5 is a schematic view of a temperature-controlled self-defined voltage source at a temperature value according to the embodiment of the present disclosure. Referring to FIG. 1, in this embodiment, a method for building a circuit device SPICE model suitable for an optical coupler circuit CRT is provided. The optical coupler circuit CRT (i.e., an optical coupler) includes an input side and an output side. The input side of the optical coupler circuit CRT includes a light source driving chip and a light source chip. The output side of the optical coupler circuit CRT includes a light detection chip, and the input side and the output side of the optical coupler circuit CRT are galvanically isolated from each other. That is to say, as shown in FIG. 2, a temperature independent circuit NH-CRT can include a temperature independent circuit NH-CRT1-1 at an input side thereof and a temperature independent circuit NH-CRT1-2 at an output side thereof. In this embodiment, pin positions of electronic elements are described according to labels. When there is no relevant label, a left side node of a horizontally arranged electronic element is a first end, and a right side node of the horizontally arranged electronic element is a second end.

Simulating an optical coupler can be performed by utilizing the SPICE circuit model of an optical coupler and a SPICE simulator installed in a computer. In this embodiment, optical coupler devices are first tested at a plurality of temperature points, have electric parameters thereof at each temperature points recorded, and the electric parameters are then utilized to build a SPICE circuit model thereof, so as to perform simulations of an optical coupler in a computer.

The method for building the SPICE circuit model of the optical coupler includes the following steps:

Step S110: providing a plurality of electrical parameters of the optical coupler for a plurality of temperature values, and according to the electrical parameters of the optical coupler corresponding to each of the temperature values, building a plurality of temperature-independent SPICE circuit models of the optical coupler respectively corresponding to the temperature values.

Step S120: forming a plurality of temperature-voltage conversion switch circuit elements.

Step S130: connecting the temperature-voltage conversion switch circuit elements corresponding to the temperature values to a plurality of temperature-independent SPICE circuit models of the optical coupler, respectively, and then connecting the temperature-independent SPICE circuit models of the optical coupler and the temperature-voltage conversion switch circuit elements in parallel to one another, so as to form a SPICE temperature simulation circuit model of the optical coupler corresponding to the optical coupler.

In step S110, various tests are performed on the optical coupler circuit CRT under the temperature values to obtain the electrical parameters of the optical coupler circuit CRT for the temperature values. The electrical parameters can include voltage parameters, current parameters, resistance parameters, time parameters, etc. Afterwards, the SPICE circuit models of the optical coupler for each of the temperature values are built according to the electrical parameters of the optical coupler tested under each of the temperature values, so as to form the temperature-independent SPICE circuit models of the optical coupler. In this embodiment, the temperature-independent SPICE circuit models include a first temperature-independent SPICE circuit model NH-CRT1 of the optical coupler, a second temperature-independent SPICE circuit model NH-CRT2 of the optical coupler, and a third temperature-independent SPICE circuit model NH-CRT3 of the optical coupler. Each of the first temperature-independent SPICE circuit model NH-CRT1 of the optical coupler, the second temperature-independent SPICE circuit model NH-CRT2 of the optical coupler, and the third temperature-independent SPICE circuit model NH-CRT3 of the optical coupler includes an input end, an output end, an input grounding end, an output grounding end, and a power supply end at the output side of the optical coupler.

That is to say, the first temperature independent SPICE circuit model NH-CRT1 of the optical coupler includes a first input end INV1, a first output end Vo1, a first input grounding end INGND1, a first output grounding end OUTGND1, and a first output power supply end Vcc1. The second temperature independent SPICE circuit model NH- CRT2 of the optical coupler includes a second input end INV2, a second output end Vo2, a second input grounding end INGND2, a second output grounding end OUTGND2, and a second output power supply end Vcc2. The third temperature independent SPICE circuit model NH-CRT3 of the optical coupler includes a third input end INV3, a third output end Vo3, a third input grounding end INGND3, a third output grounding end OUTGND3, and a third output power supply end Vcc3.

Furthermore, the first input end INV1 of the first temperature independent SPICE circuit model NH-CRT1 of the optical coupler, the second input end INV2 of the second temperature independent SPICE circuit model NH-CRT2 of the optical coupler, and the third input end INV3 of the third temperature independent SPICE circuit model NH-CRT3 of the optical coupler are each connected to one of the temperature-voltage conversion switch circuit elements, and then connected to an input end Vin.

The first output end Vo1 of the first temperature independent SPICE circuit model NH-CRT1 of the optical coupler, the second output end Vo2 of the second temperature independent SPICE circuit model NH-CRT2 of the optical coupler, and the third output end Vo3 of the third temperature independent SPICE circuit model NH-CRT3 of the optical coupler are each connected to one of the temperature-voltage conversion switch circuit elements, and then connected to an output end Vo.

The first input grounding end INGND1 of the first temperature independent SPICE circuit model NH-CRT1 of the optical coupler, the second input grounding end INGND2 of the second temperature independent SPICE circuit model NH-CRT2 of the optical coupler and the third input grounding end INGND3 of the third temperature independent SPICE circuit model NH-CRT3 of the optical coupler are connected to one another and are connected to a grounding end INGND.

The first output grounding end OUTGND1 of the first temperature independent SPICE circuit model NH-CRT1 of the optical coupler, the second output grounding end OUTGND2 of the second temperature independent SPICE circuit model NH-CRT2 of the optical coupler, and the third output grounding end OUTGND3 of the third temperature independent SPICE circuit model NH-CRT3 of the optical coupler are connected to one another and are connected to a grounding end OUTGND.

The first output end Vo1 of the first temperature independent SPICE circuit model NH-CRT1 of the optical coupler, the second output end Vo2 of the second temperature independent SPICE circuit model NH-CRT2 of the optical coupler, and the third output end Vo3 of the third temperature independent SPICE circuit model NH-CRT3 of the optical coupler are each connected to one of the temperature-voltage conversion switch circuit elements, and then connected to an output end Vo.

In addition, the first input end INV1 of the first temperature independent SPICE circuit model NH-CRT1 of the optical coupler, the second input end INV2 of the second temperature independent SPICE circuit model NH-CRT2 of the optical coupler, and the third input end INV3 of the third temperature independent SPICE circuit model NH-CRT3 of the optical coupler are each connected to one of the temperature-voltage conversion switch circuit elements, and then connected to the input end Vin. Similarly, the first output end Vo1 of the first temperature independent SPICE circuit model NH-CRT1 of the optical coupler, the second output end Vo2 of the second temperature independent SPICE circuit model NH-CRT2 of the optical coupler, and the third output end Vo3 of the third temperature independent SPICE circuit model NH-CRT3 of the optical coupler are each connected to one of the temperature-voltage conversion switch circuit elements, and then connected to the output end Vo.

In step S120, each of the temperature-voltage conversion switch circuit elements includes a control positive end+ and a control negative end −. Turning on or turning off of each of the temperature-voltage conversion switch circuit elements is determined by a voltage difference between the control positive end + and the control negative end −. Firstly, through utilizing temperature characteristics of an electrical resistor along with a voltage source or a current source, changes in temperature are converted into changes in voltage, so as to form a control voltage source Vtp that is temperature dependent. Afterwards, a plurality of temperature-controlled self-defined voltage sources VT respectively corresponding to the aforementioned temperature values {T1, T2, ... TN}, e.g., a temperature-controlled self-defined voltage source VN40 corresponding to a temperature value of −40° C., a temperature-controlled self-defined voltage source V25 corresponding to a temperature value of 25° C., a temperature-controlled self-defined voltage source V125 corresponding to a temperature value of 125° C., are formed through utilizing the self-defined voltage source and an IF conditional sentence in a SPICE environment. The control voltage source Vtp is a variable of the IF conditional sentence. Subsequently, the negative control end—is connected to a constant voltage Ctrlsw, and a value of the constant voltage Ctrlsw is not specifically limited, such as 2 V. The control positive end+ is connected to each of the temperature-controlled self-defined voltage sources VT, so as to control the turning on and turning off of the temperature-voltage conversion switch circuit elements (i.e., the aforementioned temperature-voltage conversion switch circuit elements TVC1' to TVC9') by cooperation with each of the corresponding control negative ends −. Each of the self-defined voltage sources VT can be greater than the constant voltage Ctrlsw at a predetermined temperature T by appropriately designing an IF condition of the self-defined voltage sources VT, such that the temperature-voltage conversion switch circuit elements are turned on. In addition, the temperature-voltage conversion switch circuit elements are each only turned on at one of the corresponding temperature values, and are turned off at other ones of the temperature values.

In step S130, the input end, the output end, and the output power supply end of each of the temperature-independent SPICE circuit models of the optical coupler are each connected in series with one end of one of the temperature-voltage conversion switch circuit elements corresponding to one of the temperature values. That is to say, the input end is connected in series with the one of the temperature-voltage conversion switch circuit elements, the output end is connected in series with the one of the temperature-voltage conversion switch circuit elements, and the output power supply end is connected in series with the one of the temperature-voltage conversion switch circuit elements. Afterwards, the other end of each of the temperature-voltage conversion switch circuit elements for other ones of the temperature values (which are different from one another) are connected in parallel to one another, so as to form a new input, a new output, and a new output power supply end. The input grounding end of each of the temperature-independent SPICE circuit models of an optical coupler for the different temperature values are connected in parallel to form a new input grounding end, and the output grounding end of each of the temperature-independent SPICE circuit models of an optical coupler for the different temperature values are connected in parallel to form a new output grounding end, so as to build a temperature characterized SPICE circuit model of the optical coupler.

Each of the temperature-voltage conversion switch circuit elements TVC1' to TVC9' has two control ends: the control positive end+ and the control negative end –. Moreover, each of the temperature-voltage conversion switch circuit elements includes one of the corresponding temperature-controlled self-defined voltage sources VT, such as the temperature-controlled self-defined voltage source VN40, V25, and V125. A voltage of each of the temperature-controlled self-defined voltage sources VT uses the IF statements supported by a SPICE program. An output voltage of each of the temperature-controlled self-defined voltage sources is temperature dependent. At a specific temperature, the output voltage of one of the temperature-controlled self-defined voltage sources is 5 V, which is greater than a voltage value at the control negative end – of the one of temperature-voltage conversion switch circuit elements, such that the one of the temperature-voltage conversion switch circuit elements is turned on. At other temperatures, the output voltage of the one of the temperature-controlled self-defined voltage sources is 0 V, which is smaller than the voltage value at the control negative end – of the one of the temperature-voltage conversion switch circuit elements, such that the one of the temperature-voltage conversion switch circuit elements is turned off.

The IF conditional statements of each of temperature-controlled self-defined voltage sources include the temperature-controlled voltage source Vtp. A circuit for forming the control voltage source Vtp includes a voltage source Vts, a first impedance R1, and a first temperature control impedance RT1. The first temperature control impedance RT1 can include three parameters, in which a first parameter is an impedance value, a second parameter is an operating temperature value, and a third parameter is a resistance temperature coefficient.

For example, a label (3k, tc1, 0.01) of the first temperature control impedance RT1 is shown in FIG. 3. Here, 3k represents the impedance value of 3000 ohms, tc1 represents the temperature value at which the first temperature control impedance RT1 starts to operate, and 0.01 represents the resistance temperature coefficient. In addition, a node Vtp1 is a voltage output node.

Referring to FIG. 3, for example, the first impedance R1 and the first temperature control impedance RT1 are connected in series with each other, and are then connected in parallel with a voltage source Vts of a first temperature dependent voltage source TV1.

Referring to FIG. 4, a second temperature dependent voltage source TV2 includes a current source Its and a second temperature control impedance RT2. For example, the current source Its of the second temperature dependent voltage source TV2 and the second temperature control impedance TR2 are connected in parallel to one another. In addition, a node Vtp2 is a voltage output node. In FIG. 3 and FIG. 4, the node Vtp1 and the node Vtp2 are both output ends, and are both nodes of the control voltage source.

Figure 6:
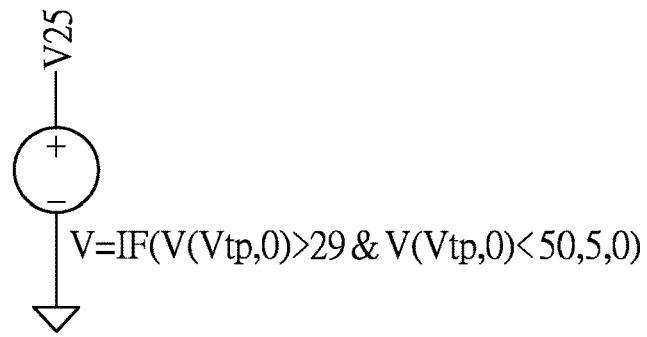
FIG. 6 is a schematic view of a temperature-controlled self-defined voltage source at another temperature value according to the embodiment of the present disclosure.
Figure 7:
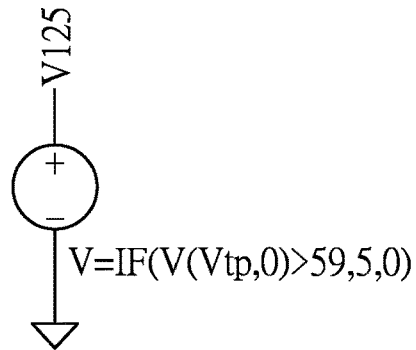
FIG. 7 is a schematic view of a temperature-controlled self-defined voltage source at yet another temperature value according to the embodiment of the present disclosure.

References are made to FIG. 5, FIG. 6, and FIG. 7. FIG. 5 is a schematic view of a temperature-controlled self-defined voltage source at a temperature value according to the embodiment of the present disclosure. FIG. 6 is a schematic view of a temperature-controlled self-defined voltage source at another temperature value according to the embodiment of the present disclosure. FIG. 7 is a schematic view of a temperature-controlled self-defined voltage source at yet another temperature value according to the embodiment of the present disclosure.

FIG. 5, FIG. 6 and FIG. 7 show the respective temperature-controlled self-defined voltage sources under the different temperature values, i.e., –40° C., 25° C., and 125° C., in this embodiment. The temperature-controlled self-defined voltage sources VN40, V25, and V125 respectively control the turning on and turning off of the temperature-voltage conversion switch circuit elements TVC1', TVC2', and TVC3' at a temperature value of –40° C., the temperature-voltage conversion switch circuit elements TVC4', TVC5', and TVC6' at a temperature value of 25° C., and the temperature-voltage conversion switch circuit elements TVC7', TVC8', and TVC9' at a temperature value of 125° C.

Next, the input end, the output end, and the output power supply end of each of the temperature-independent SPICE circuit models of the optical coupler for each of the temperature values are each connected in series with one end of one of the temperature-voltage conversion switch circuit elements TVC1' to TVC9' corresponding to one of the temperature values. That is to say, the input end is connected in series with the one of the temperature-voltage conversion switch circuit elements, the output end is connected in series with the one of the temperature-voltage conversion switch circuit elements, and the output power supply end is connected in series with the one of the temperature-voltage conversion switch circuit elements. Afterwards, the other end of each of the temperature-voltage conversion switch circuit elements for the different temperature values are connected in parallel to form a new input, a new output, and a new output power supply end. The input grounding end of each of the temperature-independent SPICE circuit models of the optical coupler for the different temperature values are connected in parallel to form a new input grounding end, and the output grounding end of each of the temperature-independent SPICE circuit models of an optical coupler for the different temperature values are connected in parallel to form a new output grounding end, so as to build a temperature characterized SPICE circuit model of the optical coupler.

Figure 8:
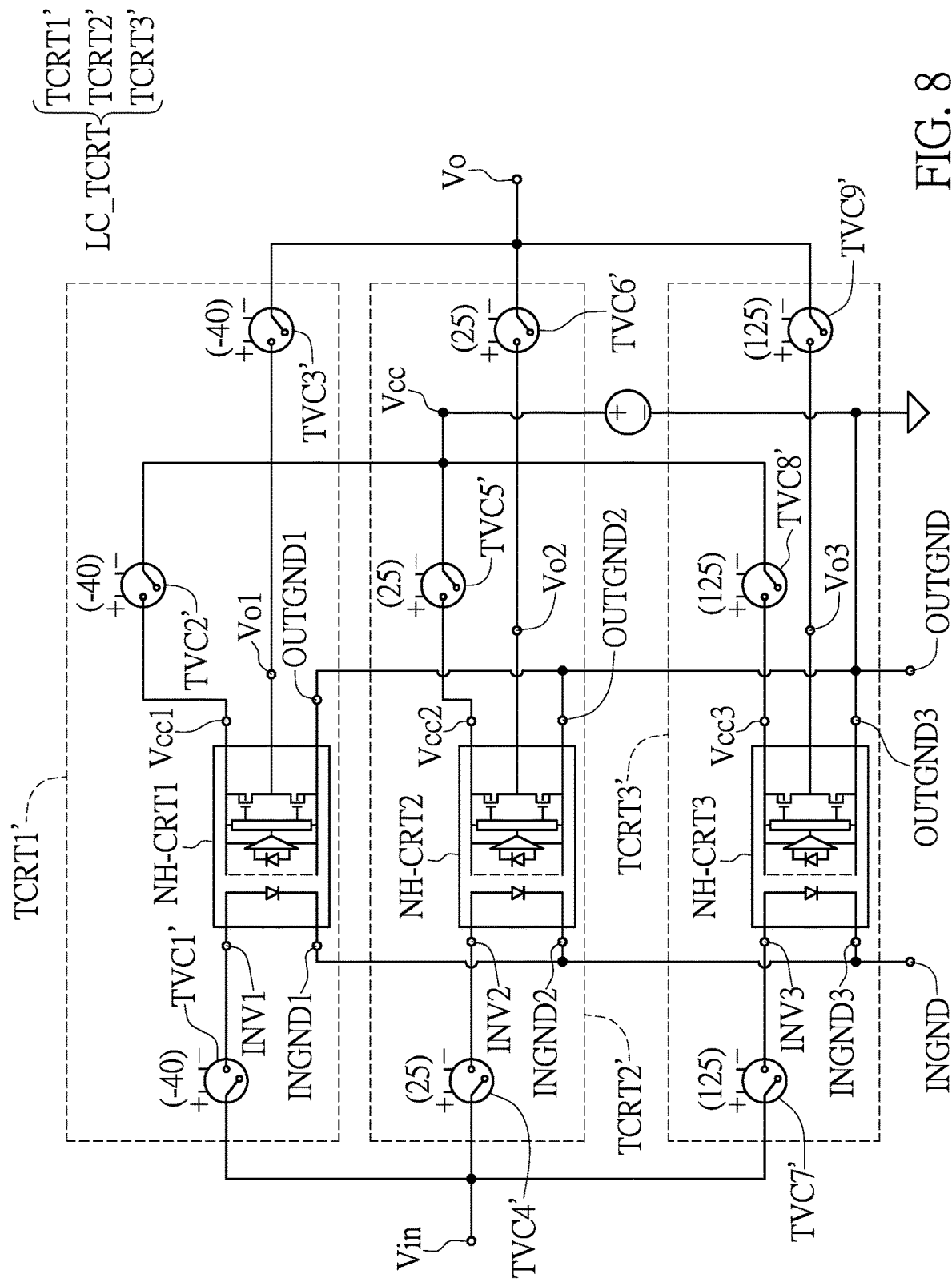
FIG. 8 is a schematic view of a SPICE temperature simulation circuit model of the optical coupler according to the embodiment of the present disclosure.

Reference is further made to FIG. 8. In this embodiment, in step S130, the temperature-voltage conversion switch circuit elements (i.e., the temperature-voltage conversion switch circuit elements TVC1' to TVC9' respectively corresponding to the different temperature values) are respectively connected to different non-temperature-affected circuits. That is to say, the temperature-voltage conversion switch circuit elements TVC1' to TVC9' corresponding to the different temperature values can be connected to two sides of the different non-temperature-affected circuits, respectively. As mentioned above, each of the temperature-independent circuits includes circuits arranged under different frameworks. Therefore, the temperature-voltage conversion switch circuit elements TVC1' to TVC9' corresponding to the different temperature values are connected to two sides of each of the temperature independent circuits. A temperature independent circuit of the optical coupler includes a first side temperature independent circuit and a second side temperature independent circuit. In other embodiments, a plurality of temperature simulation circuits can be formed by a plurality of temperature-voltage conversion switch circuit elements corresponding to even more temperature values.

A second end of the first temperature-voltage conversion switch circuit element TVC1' is connected to the first input end INV1 of the first temperature independent SPICE circuit model NH-CRT1 of the optical coupler. A first end of the first temperature-voltage conversion switch circuit element TVC1' is connected to a first end of the fourth temperature-voltage conversion switch circuit element TVC4', and a first end of the seventh temperature-voltage conversion switch circuit element TVC7'.

A first end of the second temperature-voltage conversion switch circuit element TVC2' is connected to the first output power supply end Vcc1 of the first temperature-independent SPICE circuit model NH-CRT1 of the optical coupler. A second end of the second temperature-voltage conversion switch circuit element TVC2', a second end of the fifth temperature-voltage conversion switch circuit element TVC5', and a second end of the eighth temperature-voltage conversion switch circuit element TVC8' are connected to a voltage source Vcc.

A first end of the third temperature-voltage conversion switch circuit element TVC3' is connected to the first output end Vo1 of the first temperature-independent SPICE circuit model NH-CRT1 of the optical coupler. A second end of the third temperature-voltage conversion switch circuit element TVC3' is connected to a second end of the sixth temperature-voltage conversion switch circuit element TVC6' and a second end of the ninth temperature-voltage conversion switch circuit element TVC9'.

A second end of the fourth temperature-voltage conversion switch circuit element TVC4' is connected to the second input end INV2 of the second temperature-independent SPICE circuit model NH-CRT2 of the optical coupler. The second end of the fifth temperature-voltage conversion switch circuit element TVC5' is connected to the second output power supply end Vcc2 of the second temperature-independent SPICE circuit model NH-CRT2 of the optical coupler. A first end of the sixth temperature-voltage conversion switch circuit element TVC6' is connected to the second output end Vo2 of the second temperature-independent SPICE circuit model NH-CRT2 of the optical coupler.

A second end of the seventh temperature-voltage conversion switch circuit element TVC7' is connected to a third input end INV3 of the third temperature-independent SPICE circuit model NH-CRT3 of the optical coupler. The second end of the eighth temperature-voltage conversion switch circuit element TVC8' is connected to the third output power supply end Vcc3 of the third temperature-independent SPICE circuit model NH-CRT3 of the optical coupler. A first end of the ninth temperature-voltage conversion switch circuit element TVC9' is connected to the second output end Vo3 of the third temperature-independent SPICE circuit model NH-CRT3 of the optical coupler.

In other embodiments, the temperature-voltage conversion switch circuit elements TVC1' to TVC9' corresponding to the different temperature values can be connected to the same temperature-independent circuit (i.e., one of the first, the second, or the third temperature-independent SPICE circuit model NH-CRT1, NH-CRT2, or NH-CRT3 of the optical coupler).

In this embodiment, a temperature-dependent circuit is converted into the temperature-voltage conversion switch circuit elements TVC1' to TVC9' respectively corresponding to the temperature values, such that each of the temperature-voltage conversion switch circuit elements TVC1' to TVC9' corresponding to the different temperature values is turned on at one of the corresponding temperature values for operation. For example, when one of the temperature values is −40° C., the temperature-voltage conversion switch circuit elements TVC1' to TVC3' are turned on. On the contrary, other ones of the temperature-voltage conversion switch circuit elements TVC4' to TVC9' are turned off.

In other words, the first temperature-voltage conversion switch circuit element TVC1' corresponding to a first temperature value is turned on at the first temperature value. For other ones of the temperature values, the first temperature-voltage conversion switch circuit element TVC1' corresponding to the first temperature value is turned off.

That is to say, when performing a cross temperature simulation of a circuit, the temperature-voltage conversion switch circuit elements TVC1' to TVC3' or the temperature-voltage conversion switch circuit elements of the circuit performed with the cross temperature simulation are respectively turned on or turned off according to the different temperature values, so as to perform the circuit device simulation for the different temperature values.

When the circuit device simulation is performed, a temperature simulation circuit TCRT1', which corresponds to a temperature value of −40° C., is turned on at the temperature value of −40° C.

When the circuit device simulation is performed, a temperature simulation circuit TCRT2', which corresponds to a temperature value of 25° C., is turned on at the temperature value of 25° C.

When the circuit device simulation is performed, a temperature simulation circuit TCRT3', which corresponds to a temperature value of 125° C., is turned on at the temperature value of 125° C.

In this embodiment, only three temperature simulation circuits for the three temperature values are described. In practice, when building circuit simulation devices, one temperature simulation circuit can be built for every 20° C., or even for every 5° C., so as to improve accuracy of the cross temperature simulation. Calculations can be completed through utilizing interpolation among various parameter values of the different temperature values.

Referring to FIG. 8, FIG. 8 is a schematic view of a SPICE temperature simulation circuit model of the optical coupler according to the embodiment of the present disclosure.

According to the above-mentioned steps, a SPICE temperature simulation circuit model LC-TCRT of the optical coupler as shown in FIG. 8 can be obtained. The SPICE temperature simulation circuit model LC-TCRT (i.e., the temperature-independent circuits) of the optical coupler includes a first temperature-independent circuit TCRT1', a second temperature-independent circuit TCRT2', and a third temperature-independent circuit TCRT3' of the optical coupler. A primary side of the first temperature-independent circuit TCRT1' of the optical coupler is electrically connected to a first temperature-voltage conversion switch circuit element TVC1'. Two connecting ends of a secondary side of the first temperature-independent circuit TCRT1' of the optical coupler are electrically connected to a second temperature-voltage conversion switch circuit element TVC2' and a third temperature-voltage conversion switch circuit element TVC3', respectively.

Similarly, a primary side of the second temperature-independent circuit TCRT2' of the optical coupler is electrically connected to a fourth temperature-voltage conversion switch circuit element TVC4'. Two connecting ends of a secondary side of the second temperature-independent circuit TCRT2' of the optical coupler are electrically connected to a fifth temperature-voltage conversion switch circuit element TVC5' and a sixth temperature-voltage conversion switch circuit element TVC6', respectively. A primary side of the third temperature-independent circuit TCRT3' of the optical coupler is electrically connected to a seventh temperature-voltage conversion switch circuit element TVC7'. Two connecting ends of a secondary side of the third temperature-independent circuit TCRT3' of the optical coupler are electrically connected to an eighth temperature-voltage conversion switch circuit element TVC8' and a ninth temperature-voltage conversion switch circuit element TVC9', respectively.

In this embodiment, the first temperature-voltage conversion switch circuit element TVC1', the second temperature-voltage conversion switch circuit element TVC2', and the third temperature-voltage conversion switch circuit element TVC3' operate under the temperature value of −40° C.

The fourth temperature-voltage conversion switch circuit element TVC4', the fifth temperature-voltage conversion switch circuit element TVC5', and the sixth temperature-voltage conversion switch circuit element TVC6' operate under the temperature value of 25° C.

The seventh temperature-voltage conversion switch circuit element TVC7', the eighth temperature-voltage conversion switch circuit element TVC8', and the ninth temperature-voltage conversion switch circuit element TVC9' operate under the temperature value of 125° C.

When performing a temperature sweep simulation, a temperature sweep command of a SPICE software increases or decreases an ambient temperature or a temperature of the optical coupler. When a temperature value reaches the corresponding temperature value of each of the temperature-voltage conversion switch circuit element, for example, during an initial operation, the first temperature simulation circuit TCRT1' of the optical coupler including the first temperature-voltage conversion switch circuit element TVC1', the second temperature-voltage conversion switch circuit element TVC2', and the third temperature voltage conversion switch circuit element TVC3' is activated, such that the first temperature-independent circuit TCRT1' of the optical coupler performs circuit device simulation cooperatively with the first temperature-voltage conversion switch circuit element TVC1', the second temperature-voltage conversion switch circuit element TVC2', and the third temperature voltage conversion switch circuit element TVC3'.

When the temperature value of 25° C. is reached, the second temperature simulation circuit TCRT2' of the optical coupler including the fourth temperature-voltage conversion switch circuit element TVC4', the fifth temperature-voltage conversion switch circuit element TVC5', and the sixth temperature-voltage conversion switch circuit element TVC6' is activated, such that the second temperature-independent circuit TCRT2' of the optical coupler performs circuit device simulation cooperatively with the fourth temperature-voltage conversion switch circuit element TVC4', the fifth temperature-voltage conversion switch circuit element TVC5', and the sixth temperature-voltage conversion switch circuit element TVC6'.

When the temperature value of 125° C. is reached, the third temperature simulation circuit TCRT3' of the optical coupler including the seventh temperature-voltage conversion switch circuit element TVC7', the eighth temperature-voltage conversion switch circuit element TVC8', and the ninth temperature-voltage conversion switch circuit element TVC9' is activated, such that the third temperature-independent circuit TCRT3' of the optical coupler performs circuit device simulation cooperatively with the seventh temperature-voltage conversion switch circuit element TVC7', the eighth temperature-voltage conversion switch circuit element TVC8', and the ninth temperature-voltage conversion switch circuit element TVC9'.

The various parameters for the different temperature values can be calculated by interpolation to complete the calculation. In this embodiment, a certain number of the temperature-voltage conversion switch circuit elements are provided at the input end and the output end of each of the temperature simulation circuits of the optical coupler for connection. That is, the input end and the output end of the temperature-independent circuit are respectively connected to different temperature-voltage conversion switch circuit elements.

Beneficial Effects of the Embodiment

One of the beneficial effects of the method for building a SPICE circuit model of an optical coupler provided by the present disclosure is that, the method is able to build a temperature dependent SPICE circuit model of an optical coupler including the temperature effects on the optical coupler, so as to perform the circuit device simulation of the optical coupler for each of the temperature values, and effectively enhance completeness of the circuit device simulation.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A method for building a simulation program with integrated circuit emphasis (SPICE) circuit model of an optical coupler, the optical coupler including at least two chips that are respectively mounted on two leadframes, the two leadframes not being electrically connected to each other, the method for building the SPICE circuit model of the optical coupler comprising:

providing a plurality of electrical parameters of the optical coupler for a plurality of temperature values, the electrical parameters at least including a voltage parameter, a current parameter, and a time parameter, and building the SPICE circuit model of the optical coupler at each of the temperature values according to the electrical parameters of the optical coupler for each of the temperature values, so as to form a plurality of temperature-independent SPICE circuit models of the optical coupler;

forming a plurality of temperature-voltage conversion switch circuit elements by utilizing voltage-controlled switches and temperature characteristics of an impedance, wherein the temperature-voltage conversion switch circuit elements are only turned on at a corresponding one of the temperature values, and are turned off at other ones of the temperature values; and connecting an input end, an output end, and an output power supply end of each of the temperature-independent SPICE circuit models of the optical coupler for each of the temperature values in series to an end of one of the temperature-voltage conversion switch circuit elements for the corresponding one of the temperature values; connecting the other end of each of the temperature-voltage conversion switch circuit elements for other ones of the temperature values in parallel to one another, so as to form a new input end, a new output end, and a new power supply end of each of the temperature-independent SPICE circuit models of the optical coupler for each of the temperature values; connecting an input grounding end of each of the temperature-independent SPICE circuit models of the optical coupler for each of the temperature values in parallel to one another to form a new input grounding end, and connecting an output grounding end of each of the temperature-independent SPICE circuit models of the optical coupler for each of the temperature values in parallel to one another to form a new output grounding end, so as to build a temperature characterized SPICE circuit model of the optical coupler.

2. The method according to claim 1, wherein each of the temperature-independent SPICE circuit models of the optical coupler at least includes the input end, the output end, the input grounding end, the output grounding end, and the output power supply end.

3. The method according to claim 1, wherein each of the temperature-voltage conversion switch circuit elements includes a control positive end connected to a temperature-controlled self-defined voltage source, the temperature-controlled self-defined voltage source is set by utilizing IF conditional statements supported by a SPICE program, and a voltage outputted by the temperature-controlled self-defined voltage source which is temperature dependent; wherein, when the temperature-controlled self-defined voltage source is at a corresponding one of the temperature values and the voltage outputted by the temperature-controlled self-defined voltage source is larger than a constant voltage of a control negative end of one of the temperature-voltage conversion switch circuit elements, the one of the temperature-voltage conversion switch circuit elements is turned on; wherein, when the voltage outputted by the temperature-controlled self-defined voltage source at other ones of the temperature values is smaller than the constant voltage of the control negative end of the one of the temperature-voltage conversion switch circuit elements, the one of the temperature-voltage conversion switch circuit elements is turned off.

4. The method according to claim 3, wherein the temperature-controlled self-defined voltage source includes a first temperature dependent voltage source; wherein the first temperature dependent voltage source includes a voltage source, a first impedance, and a first temperature control impedance, and the voltage source is connected in parallel to the first impedance and the first temperature control impedance that are connected to each other in series.

5. The method according to claim 4, wherein, when the temperature-independent SPICE circuit models of the optical coupler perform a circuit device simulation through the simulation program, the temperature-voltage conversion switch circuit elements of the temperature-independent SPICE circuit models of the optical coupler are respectively turned on or turned off according to the temperature values that are different from one another, so as to perform the circuit device simulation at the temperature values.

6. The method according to claim 5, wherein each of the temperature-independent SPICE circuit models of the optical coupler includes an input end non-temperature-affected circuit and an output end non-temperature-affected circuit, and each of the temperature-voltage conversion switch circuit elements is connected to a corresponding one of the input end non-temperature-affected circuit and a corresponding one of the output end non-temperature-affected circuit.

* * * * *